(12) United States Patent
Gros-Daillon et al.

(10) Patent No.: US 8,844,374 B2
(45) Date of Patent: Sep. 30, 2014

(54) DEVICE FOR MEASURING SPEED OF A FLUID FLOWING IN A PIPE HAVING A BEARING AND A HYDRAULIC CIRCUIT

(75) Inventors: Luc-Francois Gros-Daillon, Brie et Angonnes (FR); Geraud Francois Cubizolles, Grenoble (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 414 days.

(21) Appl. No.: 13/377,939

(22) PCT Filed: Jun. 14, 2010

(86) PCT No.: PCT/EP2010/058305
§ 371 (c)(1),
(2), (4) Date: Dec. 13, 2011

(87) PCT Pub. No.: WO2010/146017
PCT Pub. Date: Dec. 23, 2010

(65) Prior Publication Data
US 2012/0090405 A1 Apr. 19, 2012

(30) Foreign Application Priority Data

Jun. 15, 2009 (FR) ...................................... 09 53983

(51) Int. Cl.
*G01F 1/05* (2006.01)
*G01P 5/06* (2006.01)

(52) U.S. Cl.
CPC ....................................... *G01P 5/06* (2013.01)

USPC ...................................................... 73/861.79

(58) Field of Classification Search
None
See application file for complete search history.

(56) References Cited

U.S. PATENT DOCUMENTS

| 2,969,131 A | * | 1/1961 | Black et al. ................... 192/3.26 |
| 3,466,952 A | | 9/1969 | Greenberg et al. |
| 2010/0174231 A1 | * | 7/2010 | Horvath et al. ................. 604/67 |

FOREIGN PATENT DOCUMENTS

| GB | 1 242 702 | | 8/1971 |
| GB | 1 262 852 | | 2/1972 |
| GB | 2 246 176 A | | 1/1992 |

OTHER PUBLICATIONS

Preliminary Search Report and Written Opinion issued Feb. 2, 2010 in French Application No. 0953983 (With English Translation of Category of Cited Documents).

* cited by examiner

*Primary Examiner* — Harshad R Patel
(74) *Attorney, Agent, or Firm* — Oblon, Spivak, McClelland, Maier & Neustadt, L.L.P.

(57) ABSTRACT

A device to measure speed of a fluid in a pipe. An adjustment and a surface finish are accomplished between a fluid bearing and a hollow tube coupled with a turbine, with friction minimized to a point that it is possible to measure speeds of less than one cm/s which have hitherto been unexplored.

11 Claims, 4 Drawing Sheets

Figure 1:
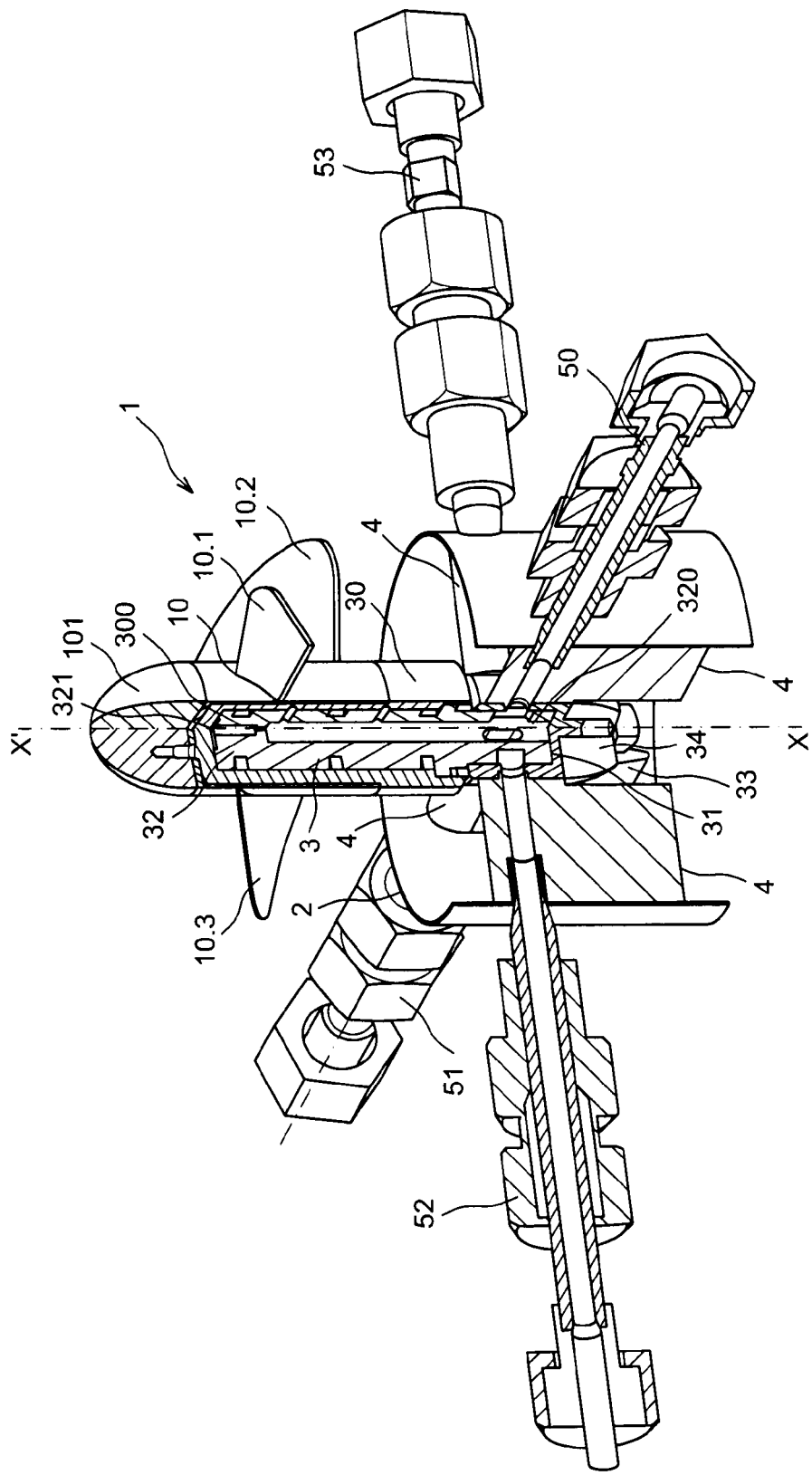

DEVICE FOR MEASURING SPEED OF A FLUID FLOWING IN A PIPE HAVING A BEARING AND A HYDRAULIC CIRCUIT

TECHNICAL FIELD

The invention concerns a device to measure the speed of a fluid flowing in a pipe.

The applications covered by the invention are all those requiring measurements of the flow rate or of the speed of a fluid at very low speed, and which notably enable dimensioning tools or safety analysis tools to be qualified.

A particular application is that of the measurement of the speed of a heat-carrying fluid in a nuclear power reactor in all operating conditions, both under normal operation (forced convection) or in accidental situations or situations of passive cooling (natural convection).

PRIOR ART

Hitherto various measuring devices have been used to measure low-speed flows.

The various technologies used currently, among which are those using a turbine assembled on a bearing (sapphire pivot, ball bearing), generally with few blades at a slight inclination, do not enable flow speeds of less than approximately 1 cm/s to be measured (in the case of water or the equivalent of water). Indeed, due to their design and manufacture, the existing turbines block, i.e. no longer rotate, in fluids flowing at speeds of less than 1 cm/s.

However, the inventors have a requirement to know flow speeds of below this value. Indeed, in the absence of such knowledge, it is not reasonably possible to qualify pipe dimensioning tools or analysis tools in accidental cases of cooling under natural convection in nuclear reactors.

The aim of the invention is thus to provide a technological solution to measure the flow speeds of fluids, such as liquid water, of less than one cm/s.

A particular aim is to provide such a solution at low cost.

ACCOUNT OF THE INVENTION

To that end, the object of the invention is a device for measuring the speed of a fluid flowing in a pipe, including:
- a turbine including multiple blades of external diameter of the order of the internal diameter of the pipe,
- a bearing of the fluid type including, as a moving element, a hollow tube, which is blind on one side and coupled with the blades, as an element which is attached relative to the pipe, a shaft adjusted in the hollow tube and perforated internally by at least a first channel, called the lubrication fluid inlet channel, and at least a second channel, called the lubrication fluid drainage channel, where the first and second channels define a portion of a hydraulic circuit.

According to the invention, a hydraulic circuit is adapted, during the supply of the inlet channel(s) from outside the pipe by a pressurised lubrication fluid, to cause the latter to circulate at once between the periphery of the shaft and the hollow tube, and between the end of the shaft and the base of the hollow tube in the form of a film of thicknesses corresponding to the plays between the perforated shaft and the hollow tube, and is then recovered through the drainage channel(s), where the lubrication fluid film created in this manner and the surface finish of the adjusted walls of the hollow tube and of the shaft are such that the friction generated between the latter is minimal, to such a degree that it is possible for the blades of the turbine to rotate, and therefore for their speed to be measured when a fluid flows in the pipe at speeds of less than one cm/s.

The end play between the perforated shaft and the hollow tube is preferably less than 50 μm, and typically of the order of 22 μm.

Also preferably, the radial play, called the play on the radius, between the perforated shaft and the hollow tube is less than 50 μm, and typically of the order of 32 μm.

Advantageously, the surface finish of the adjusted walls of the hollow tube and of the shaft is less than 0.1 μm.

According to an advantageous embodiment, a hydraulic circuit includes:
- a lubrication fluid inlet channel perforated internally along the length of the shaft and centred in it,
- an axial hydraulic flow chamber, into which the inlet channel emerges via a calibrated hydraulic resistance, and emerging at the end of the shaft opposite the base of the blind tube,
- two radial hydraulic flow chamber stages into each of which the inlet channel emerges via a calibrated hydraulic resistance, and emerging radially on the circumference of the shaft, where each flow stage is manufactured with an axial dimension different from the other flow stage, and includes at least three identical chambers uniformly distributed on the circumference of the shaft,
- three lubrication fluid drainage channels each perforated internally in the shaft, and distributed in parallel around the lubrication fluid inlet channel,
- three drainage stages each emerging simultaneously over the entire periphery of the shaft and on one of the lubrication fluid drainage channels; where one of the drainage stages is manufactured with a dimension between the two dimensions of the flow stages, and where another of the drainage stages is manufactured with a dimension between the dimension of the radial flow stage closest to the axial flow chamber and the dimension of the latter, and where the third of the stages is manufactured at the end of the shaft opposite the one facing the base of the hollow tube. The calibrated hydraulic resistances all have the same value.

The inventors wished to combine judiciously the existing functions of a fluid thrust bearing, commonly called a hydrostatic thrust bearing, of the mono-directional type, and of a fluid dynamic bearing, commonly called a hydrostatic bearing, but without being obliged to install two fluid bearings separated from one another as is habitually the case in order to keep the load in the axis of the bearing in the event of a substantial radial torque value.

Indeed, the inventors were familiar with the function of a mono-directional fluid thrust bearing (hydrostatic thrust bearing), namely to keep a load in an axial position along a single axial direction (upwards), whatever the disturbances to which the bearing is subject. They were also familiar with the function of a fluid dynamic bearing (hydrostatic bearing), which is to keep the load in the axis of the bearing. But hitherto, whatever the application considered, when it was desired to obtain a sufficient radial momentum adjusting torque, it was absolutely essential to use two bearings separated from one another by a minimal distance.

The inventors then judiciously designed a single part (a hollow shaft) perforated internally, incorporating all the functions in it (mono-directional fluid dynamic thrust bearing; fluid dynamic bearing; radial momentum adjusting torque).

In other words, the axial chamber defined in this manner in the hollow shaft performs the function of the mono-directional fluid dynamic thrust bearing (hydrostatic thrust bearing), whereas the radial chamber stages play the role of fluid dynamic bearings (hydrostatic bearings), and the dimension between two consecutive stages is sufficient to obtain the desired radial momentum adjusting torque.

According to a variant embodiment, the blades of the turbine are attached on a hub inside which is fitted and attached the hollow tube in which the perforated shaft is adjusted.

According to another variant embodiment, the blades of the turbine are attached on a hub which constitutes the hollow tube in which the perforated shaft is adjusted.

To install the device in a pipe the hollow shaft is preferably attached to a supporting structure, at least one portion of which is perforated by a pipe connected to the lubrication fluid inlet channel in order to convey the said fluid radially into the shaft, and at least one portion of which is perforated by a pipe connected to the lubrication fluid drainage channel, to evacuate the said fluid radially after it has lubricated the bearing.

In order to maintain the turbine axially opposite the thrust bearing, the device according to the invention may include a shaft axial retaining clip inserted in a groove made in the hollow tube so as to act as a stop with a shoulder of the shaft.

A flow rate of the order of 7 cc/s at a pressure of 0.5 bars in the hydraulic circuit is advantageous.

The invention also concerns the use of the measuring device described above in a roughly vertical flow pipe, or flow pipe with a slight inclination relative to vertical, typically at an angle of less than 30° relative to vertical.

BRIEF DESCRIPTION OF THE ILLUSTRATIONS

Figure 2:
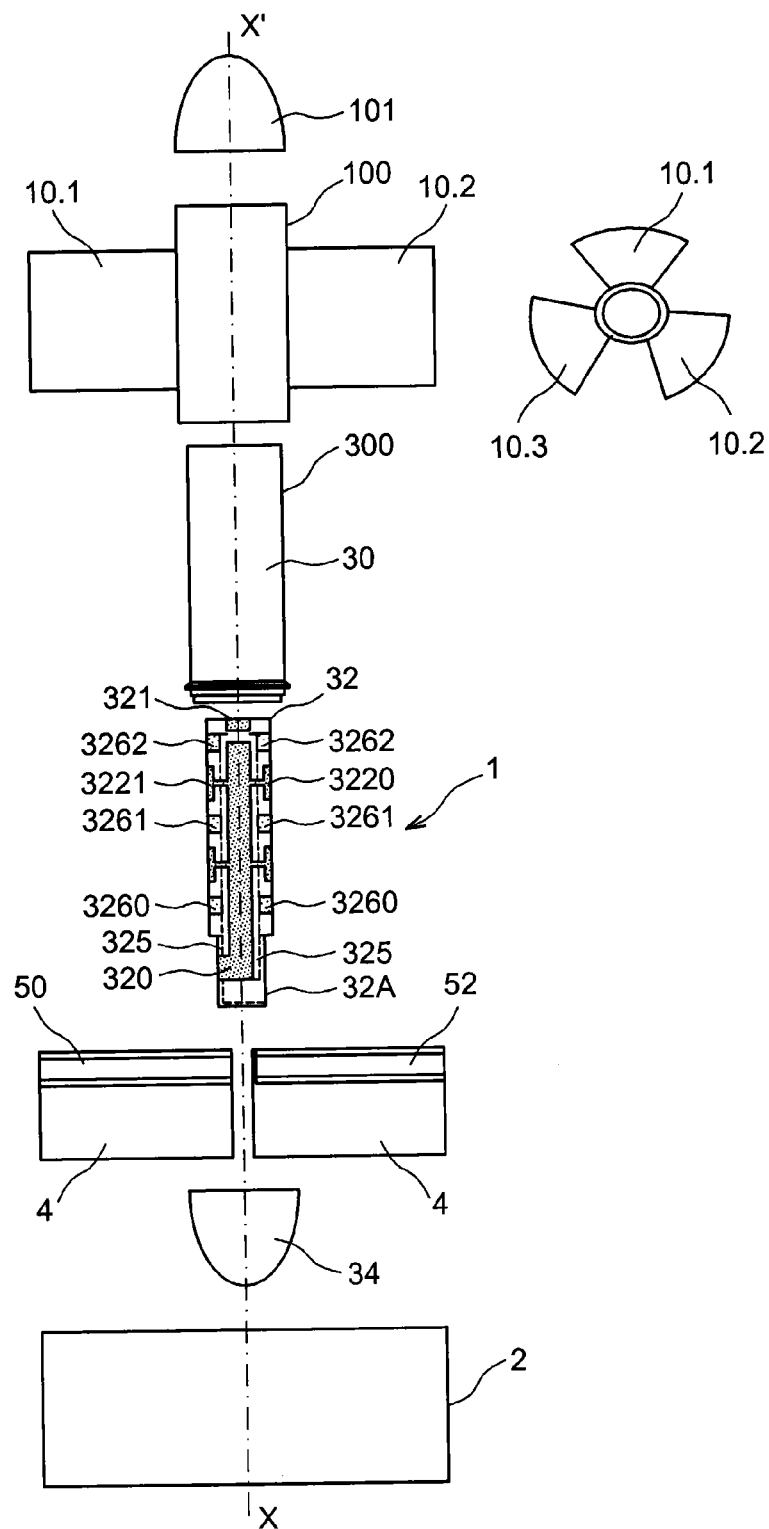
Figure 2A:
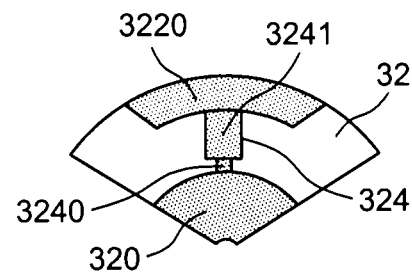
Figure 2B:
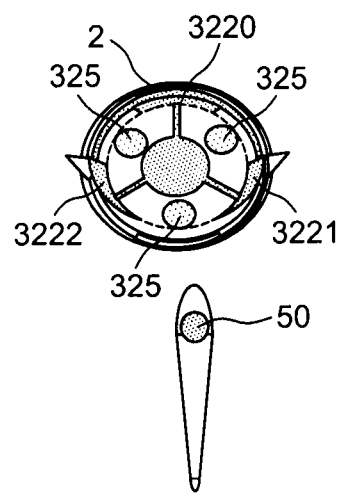
Figure 2C:
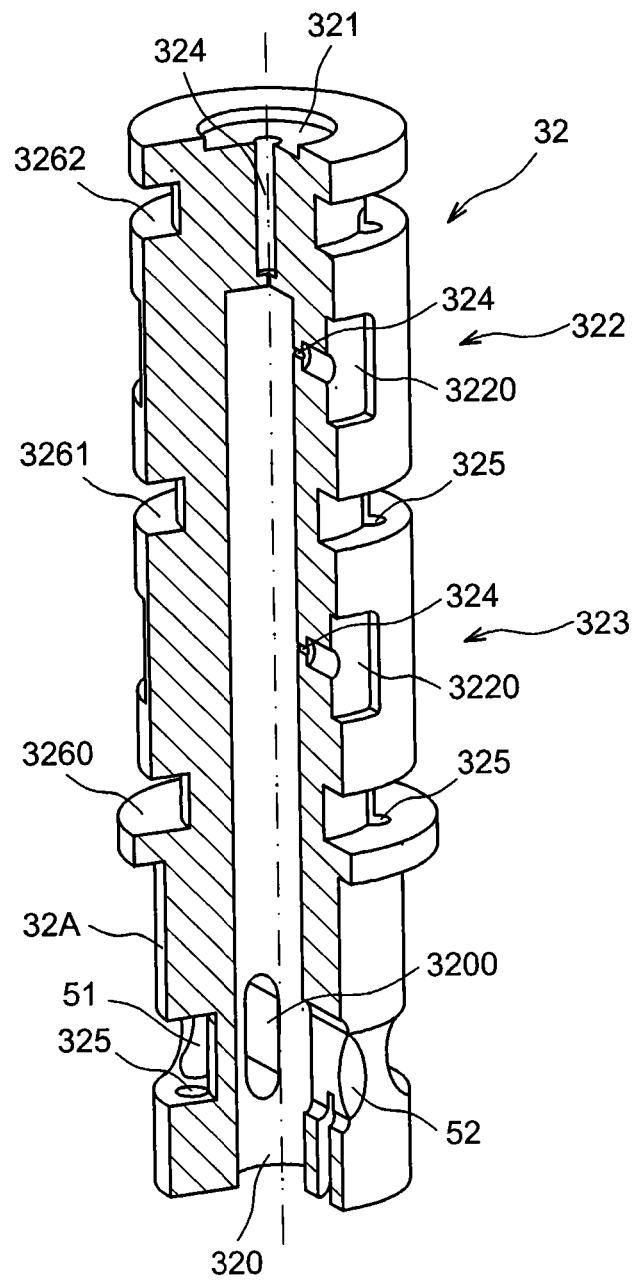

Other advantages and characteristics will be seen more clearly on reading the detailed description of the invention given as an illustrative example, and not restrictively with reference to the following figures, among which:

FIG. 1 is a perspective partial section view of a measuring device according to an embodiment of the invention as installed in a pipe, FIG. 2 is an exploded lengthways section view along axis XX' of the device, FIG. 2A is a transverse section view of the assembled device, FIG. 2B is a detailed view showing a hydraulic chamber according to the invention, FIG. 2C is a perspective partial section view of a shaft of the fluid bearing according to the invention.

DETAILED ACCOUNT OF PARTICULAR EMBODIMENTS

In FIG. 1 a device 1 according to the invention to be installed in a pipe has been represented. It is stipulated here that the installation is shown in the actual alignment of the fluid to be measured: a roughly vertical flow, or a flow which is slightly inclined relative to vertical, typically at an angle of less than 30° relative to vertical.

Measuring device 1 according to the invention can measure equally fluid speeds flowing vertically from top to base, and vice versa.

In the remainder of the description, the terms "upper" and "lower" are used with reference to the installation according to FIG. 1: thus, upper hub cover 101 is the hub cover of the turbine positioned above, and the lower hub cover is the hub cover of the device positioned below.

Device 1 firstly includes a turbine 10 consisting of three mutually identical blades 10.1, 10.2, 10.3, of external diameter of the order of the internal diameter of a pipe to be explored. These blades 10.1, 10.2 and 10.3 are attached to a hub 100. At the other end of hub 100 an upper hub cover 101 is attached.

Device 1 also includes a fluid type bearing 3. Where this bearing 3 includes, as a moving element, a hollow tube 30, which is blind on one side and coupled with hub 100.

Element 31 of bearing 3 which is stationary relative to the pipe includes a shaft 32 adjusted in hollow tube 30. Shaft 32 includes a diminution 32A. Although not shown, an axial retaining clip for shaft 32 is included, where this clip is inserted in a groove made in hollow tube 30 in order to act as a stop with a shoulder of the shaft. This enables the turbine to be maintained axially opposite the hydrostatic thrust bearing as described in detail below.

The fixed element of the bearing also includes a bushing 33 which acts as a fastener to a set of four radial stiffeners 4, which are themselves fastened to a ring 2. The supporting structure of measuring device 1 according to the invention is thus constituted by ring 2 with the four radial stiffeners 4. Bushing 33 is extended by a lower hub cover 34. The four mutually identical stiffeners 4 have an external shape which is profiled such that they do not disrupt the flow of the fluid in a pipe when this flow is high-speed (up to a value of 3 to 4 m/s). The stiffeners include fluid pipes for supply 50, 51, and drainage 52, 53 of the bearing as described in detail below.

Shaft 32 is perforated internally with several channels constituting a portion of a hydraulic circuit which it is sought to manufacture according to the invention.

Thus, the circuit firstly includes a lubrication fluid inlet channel 320 perforated internally along the length of shaft 32 and centred in it. As illustrated in FIG. 1, the lubrication fluid must be conveyed it in operation from the outside radially through the two diametrically opposed supply pipes 50, 51, by traversing two of the stiffeners 4, and by emerging in inlet channel 320 through inlet windows 3200.

Shaft 32 also includes an axial hydraulic flow chamber 321 into which inlet channel 320 emerges via a calibrated hydraulic resistance 3200. This axial hydraulic chamber 321 emerges at the end of the shaft opposite the base 300 of tube 30.

The circuit also includes two radial hydraulic flow chamber stages 322, 323, into each of which inlet channel 320 emerges via a calibrated hydraulic resistance 324, emerging radially on the circumference of shaft 32 (FIG. 2). Each flow stage 322, 323 is manufactured with a different axial dimension from the other stage. In the illustrated embodiment, each stage 322 or 323 at least three identical chambers distributed uniformly over the circumference of the shaft. Thus, in FIG. 2B, stage 322 includes exactly three identical chambers 3220, 3221 and 3222 distributed 120° relative to one another.

The circuit includes three lubrication fluid drainage channels 325 each perforated internally in the shaft 32, and distributed in parallel fashion around lubrication fluid inlet channel 320.

Finally, the circuit includes three drainage stages 3260, 3261, 3262 each emerging simultaneously over the entire periphery of shaft 32 and on one of lubrication fluid drainage channels 325.

One of drainage stages 3261 is manufactured with a dimension between the two dimensions of flow stages 322, 323. Another of drainage stages 3262 is manufactured with a dimension between the dimension of radial flow stage 322 closest to axial flow chamber 321 and the dimension of the latter. The third of stages 3260, finally, is manufactured at the end of shaft 32 opposite the end facing the base 300 of hollow tube 30.

In the measuring device according to the invention, calibrated hydraulic resistances 324 all have the same value.

The fluid drained in stages 3260, 3261 and 3262 is evacuated from device 1 radially through pipes 52 and 53 perforated in the other two stiffeners 4.

Thus, fluid bearing 3 according to the invention accomplishes the functions both of a fluid dynamic bearing (or hydrostatic bearing) and of a mono-directional thrust bearing (or hydrostatic thrust bearing) with two stages 322, 323 of three bearing chambers with a thrust chamber at the end 321, i.e. seven chambers supplied through seven hydraulic control resistances 234, where the stages of chambers 322, 323 are separated by drainage stages 3260, 3261, 3262. In this fluid bearing the weight of the moving equipment constituted by turbine 10 including hub 100 with the three coupled blades 10.1, 10.2 and 10.3 and hollow tube 30 which is coupled with hub 100, acts as a counter thrust bearing for shaft 32.

In operation, i.e. when a fluid is flowing in a pipe in which the measuring device according to the invention is installed, the manufactured hydraulic circuit is supplied through its inlet channel 320 from pipes 50, 51, i.e. from the outside, with a pressurised lubrication fluid.

This lubrication fluid then circulates both between the periphery of shaft 32 and hollow tube 30, and between the end of shaft 321 and the base of hollow tube 300 in the form of a film of a thicknesses equal to the plays between perforated shaft 32 and hollow tube 30. It is then recovered through drainage stages 3260, 3261, 3262.

According to the invention, the lubrication fluid film created in this manner and the surface finish of the adjusted walls of hollow tube 30 and of shaft 32 are such that the friction generated between them is minimal, to the degree that blades 10.1, 10.2, 10.3 of turbine 10 can rotate, and therefore that their speed can be measured when the fluid flows in the pipe at speeds of less than one cm/s.

To finalise the sought measurement, detection means are installed in the wall of the pipe in which the fluid flows, facing the circumference swept by turbine blades 10.1, 10.2, 10.3. These detection means can advantageously be detectors known as "proximity detectors" which measure the top signal between each passage of a blade.

As an example, a measuring device 1 was manufactured with the following dimensions, manufacturing tolerances and surface states.

Dimensions of Bearing 3 and Hollow Tube 30:
  Bearing 3
    Shaft 32
      Diameter: 20.00 mm
      Length: 50.40 mm
    Diminution 32A of shaft 32
      Diameter: 18.0 mm
      Length: 15.0 mm
    Inlet channel 320
      Diameter: 7.0 mm centred on axis XX'
    Axial chamber or thrust bearing 321
      Depth: 1.0 mm
      Diameter: 10.0 mm
    Stages of radial chambers 322, 323
      Length: angle of ⅛$^{th}$ of circumference, i.e. as the developed value 7.85 mm
      Height: 7.80 mm
      Distance between a chamber stage 322, 323 and a drainage stage 326: 5.20 mm
      Respective dimension between the middle of the stage of radial chambers 322 and 323 and the end at the far end of chamber 321: 14.10 mm and 36.30 mm
    Hydraulic control resistance 324
      Diameter of portion 3240: 480 μm+/−10 μm
      Length of portion 3240: 1 mm
      Diameter of portion 3241: 2.0 mm
    Circumferential drainage stages 326
      Depth: 3.0 mm
      Height: 4.0 mm
      Respective dimensions between the middle of each drainage stage 326 and the end at the far end of chamber 321: 3.00 mm, 25.20 mm and 47.40 mm
    Drainage channels 325
      Three pipes off-centred relative to XX'
      Individual diameter: 4.0 mm
  Hollow tube 30 forming a dome:
    Internal diameter: 20.0 mm
    External diameter: 22.0 mm
    Length: 50.0 mm Tolerances and Surface Finish Between Bearing 3 and Hollow Tube 30

At equilibrium the axial play between hollow tube 30 and shaft 32 is 22 μm and the radius play is 32 μm, and the assembly must be machined for a radius play of 32+/−2 μm.

The base 300 of dome 30 and shaft end 32 must remain parallel to within 2 μm.

The surface finish of the two cylinders 30 and 32 must be less than 0.1 μm. Thus, all the corners will be rounded off to remove burrs, and the parts will be cleaned to eliminate all impurities of a size greater than 0.1 μm.

Dimensions, Tolerances and Surface Finish on Turbine 10, Supporting Structure 2.4 and Hub Covers 101, 34
  Turbine 10
    Turbine hub 100
      Diameters: 22*24 mm which give a tight assembly on dome 30
      Height: 40 mm
    Blades 10.1, 10.2, 10.3
      Number: 3
      Diameter: 87.3 mm
      Step: 100.0 mm
      Optical angle: 30°
      Thickness: 1.0 mm
      Tolerances: outside the tightening for dome 30 the tolerances are 0.1 mm.
      Surface finish: 0.1 μm
  Supporting structure
    Ring 2
      Diameters: 87.3*89.3 mm
      Height: 45.0 mm
    Profiled stiffeners 4
      Number: 4
      Maximum thickness: 7.0 mm
      Height: 45.0 mm
    Fluid supply pipes 50, 52
      Diameter: 5.0 mm
      General tolerances of the supporting structure: 0.1 mm,
      Surface finish: 0.1 μm
  Hub covers 101 and 34:
    They are half-ellipses in shape, with Rx/Ry of the order of 1.5, adapted for the diameters of dome 30 and of hub 100 of turbine 10
    Tolerances: +/−0.1 mm,
    Surface finish: 0.1 μm.

The device according to the above embodiment may be supplied by a flow rate of fluid, for example water, of the order of 7 cc/s at a pressure of 0.5 bars.

The measuring device which has just been described is relatively simple to machine and therefore has an acceptable cost for the measuring function at very low flow speeds which are sought in connection with the invention (less than one cm/s).

Thus, knowledge of fluid speeds hitherto considered to zero may be obtained: by this means dimensioning tools may be qualified, and a measuring device according to the invention may be used in experiments into the safety of nuclear reactors, for example in experiments reproducing accidental cases of cooling under natural convection.

A particularly interesting example is the case of the properties of a reactor core when in what is known as "thermosiphon mode", i.e. in which the flow is occurring under natural convection.

In addition, it is also possible to use the same device to measure relatively high fluid flow speeds, of the order of a few m/s: the measuring device is thus adapted for a broad range of speeds of fluids flowing in a pipe, without there being any requirement to change it. In other words, the same device may be used for a fluid which is flowing at very low speeds of less than one cm/s, and, for this same fluid where the speed may increase to as high as a few m/s.

Finally, it is possible to use the fluid which is desired to measure the flow rate of liquid as lubrication: to this end, one need merely create a bypass of the flowing fluid circuit in order to produce the lubrication circuit.

The invention claimed is:

1. A device for measuring speed of a fluid flowing in a pipe, comprising:
    a turbine including multiple blades of external diameter of order of an internal diameter of the pipe;
    a bearing of fluid bearing type, including, as a moving element, a hollow tube, which is blind on one side and coupled with the blades, as an element which is attached relative to the pipe, a shaft adjusted in the hollow tube and perforated by at least a first channel, as a lubrication fluid inlet channel, and at least a second channel, as a lubrication fluid drainage channel,
    wherein the first and second channel define a portion of a hydraulic circuit, in which the hydraulic circuit is adapted, when the inlet channel is supplied from outside the pipe by a pressurized lubrication fluid, to cause the pressurized lubrication fluid to circulate simultaneously between the periphery of the shaft and the hollow tube and between an end of the shaft and a base of the hollow tube in a form of a film of thicknesses equal to plays between the perforated shaft and the hollow tube, and is then recovered through the drainage channel,
    wherein the lubrication fluid film created in this manner and the surface finish of the adjusted walls of the hollow tube and of the shaft are such that the friction generated between the latter is minimal, to such a degree that it is possible for the blades of the turbine to rotate, and therefore for their speed to be measured when a fluid flows in the pipe at speeds of less than one cm/s.

2. A device according to claim 1, wherein the end play between the perforated shaft and the hollow tube is less than 50 μm, or is of an order of 22 μm.

3. A device according to claim 1, wherein the end play, as the play on the radius, between the perforated shaft and the hollow tube is less than 50 μm, or is of an order of 32 μm.

4. A device according to claim 1, wherein the surface finish of the adjusted walls of the hollow tube and of the shaft is less than 0.1 μm.

5. A device according to claim 1, wherein the hydraulic circuit includes:
    a lubrication fluid inlet channel perforated internally along the length of the shaft and centered in it;
    an axial hydraulic flow chamber, into which the inlet channel emerges via a calibrated hydraulic resistance, and emerging at the end of the shaft opposite the base of the blind tube;
    two radial hydraulic flow chamber stages into each of which the inlet channel emerges via a calibrated hydraulic resistance, and emerging radially on the circumference of the shaft, wherein each flow stage is manufactured with an axial dimension different from the other flow stage, and includes at least three identical chambers uniformly distributed on the circumference of the shaft;
    three lubrication fluid drainage channels each perforated internally in the shaft, and in parallel around the lubrication fluid inlet channel;
    three drainage stages each emerging simultaneously over an entire periphery of the shaft and on one of the lubrication fluid drainage channels;
    wherein one of the drainage stages is manufactured with a dimension between the two dimensions of the flow stages, and wherein another of the drainage stages is manufactured with a dimension between the dimension of the radial flow stage closest to the axial flow chamber and the dimension of the latter, and wherein the third of the drainage stages is manufactured at the end of the shaft opposite the one facing the base of the hollow tube;
    in which the calibrated hydraulic resistances all have a same value.

6. A device according to claim 1, wherein the blades of the turbine are attached on a hub inside of which is fitted and attached the hollow tube in which the perforated shaft is adjusted.

7. A device according to claim 1, wherein the blades of the turbine are attached on a hub which constitutes the hollow tube in which the perforated shaft is adjusted.

8. A device according to claim 1, wherein the shaft is attached to a supporting structure, at least one portion of which is perforated by a pipe connected to the lubrication fluid inlet channel to convey the fluid radially into the shaft, and at least one portion of which is perforated by a pipe connected to the lubrication fluid drainage channel, to evacuate the fluid radially after it has lubricated the bearing.

9. A device according to claim 1, further comprising a shaft axial retaining clip inserted in the groove made in the hollow tube to act as a stop with a shoulder of the shaft.

10. A device according to claim 1, wherein the hydraulic circuit is adapted to receive a flow rate of the order of 7 cc/s at a pressure of 0.5 bars.

11. Use of the measuring device according to claim 1, in a roughly vertical flow pipe, or flow pipe with a slight inclination relative to vertical, typically at an angle of less than 30° relative to vertical.

* * * * *